(12) United States Patent
Arnold et al.

(10) Patent No.: US 10,590,807 B2
(45) Date of Patent: Mar. 17, 2020

(54) COMBINED CYCLE POWER PLANT

(71) Applicant: General Electric Technology GmbH, Baden (CH)

(72) Inventors: Raimond Arnold, Lauchringen (DE); Christoph Ruchti, Uster (CH); Glenn T. Selby, West Simsbury, CT (US)

(73) Assignee: General Electric Company, Schenectady, NY (US)

( * ) Notice: Subject to any disclaimer, the term of this patent is extended or adjusted under 35 U.S.C. 154(b) by 481 days.

(21) Appl. No.: 15/176,680

(22) Filed: Jun. 8, 2016

(65) Prior Publication Data

US 2016/0281543 A1 Sep. 29, 2016

Related U.S. Application Data

(63) Continuation of application No. PCT/EP2014/078467, filed on Dec. 18, 2014.

(30) Foreign Application Priority Data

Dec. 19, 2013 (EP) ..................................... 13198291

(51) Int. Cl.
*F01K 23/10* (2006.01)
*F22B 37/20* (2006.01)
*F22G 3/00* (2006.01)

(52) U.S. Cl.
CPC .......... *F01K 23/106* (2013.01); *F22B 37/205* (2013.01); *F22G 3/008* (2013.01); *Y02E 20/16* (2013.01)

(58) Field of Classification Search
CPC ...... F01K 23/10; F01K 23/106; F22B 37/205; F22B 37/202; F22G 3/008
See application file for complete search history.

(56) References Cited

U.S. PATENT DOCUMENTS

| 5,649,416 A | 7/1997 | Moore |
| 6,019,070 A | 2/2000 | Duffy |
| 8,387,356 B2* | 3/2013 | Yang .......................... F01K 7/24 60/39.182 |
| 2011/0185726 A1* | 8/2011 | Burns ..................... F01K 23/10 60/618 |

FOREIGN PATENT DOCUMENTS

| CN | 203271834 U | 11/2013 |
| EP | 0 620 363 A1 | 10/1994 |
| EP | 0 718 470 A2 | 6/1996 |
| EP | 0 953 732 A2 | 11/1999 |
| JP | S6-088186 U | 6/1985 |

(Continued)

OTHER PUBLICATIONS

Machine Translation and First Office Action and Search issued in connection with corresponding CN Application No. 201480076028.1 dated Feb. 2, 2018.

(Continued)

*Primary Examiner* — Arun Goyal
(74) *Attorney, Agent, or Firm* — Charlotte C. Wilson

(57) ABSTRACT

The invention relates a combined cycle power plant with a gas turbine, a shaft connecting a compressor to a turbine, and a first generator, a heat recovery steam generator fluidly connected to the exhaust of the gas turbine.

14 Claims, 6 Drawing Sheets

(56) References Cited

FOREIGN PATENT DOCUMENTS

| JP | S04-108110 U | 9/1992 |
| JP | H06-294305 A | 10/1994 |
| JP | H10-288009 A | 10/1998 |
| JP | 2002-071103 A | 3/2002 |

OTHER PUBLICATIONS

Machine Translation and Notification of Reasons for Refusal issued in connection with corresponding JP Application No. 2016-539094 dated Dec. 26, 2018.

* cited by examiner

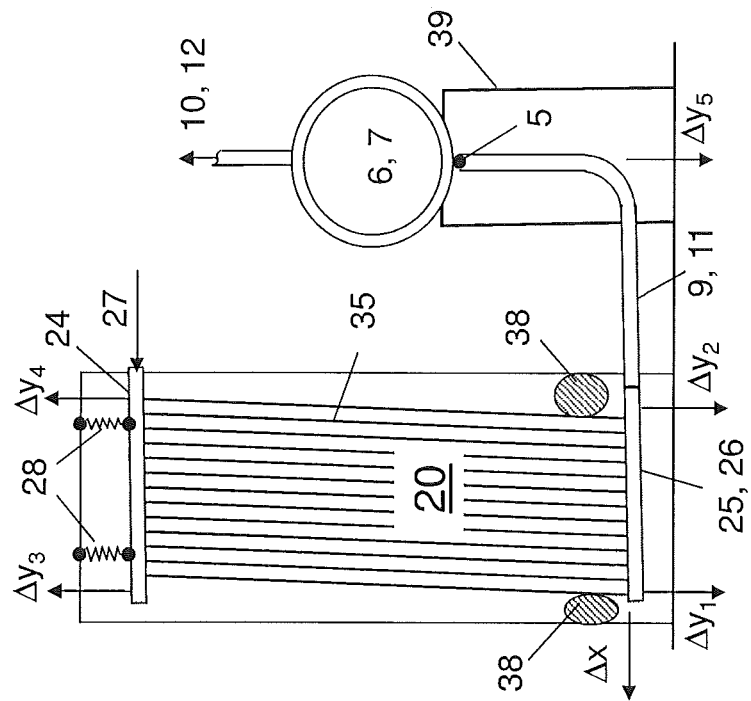
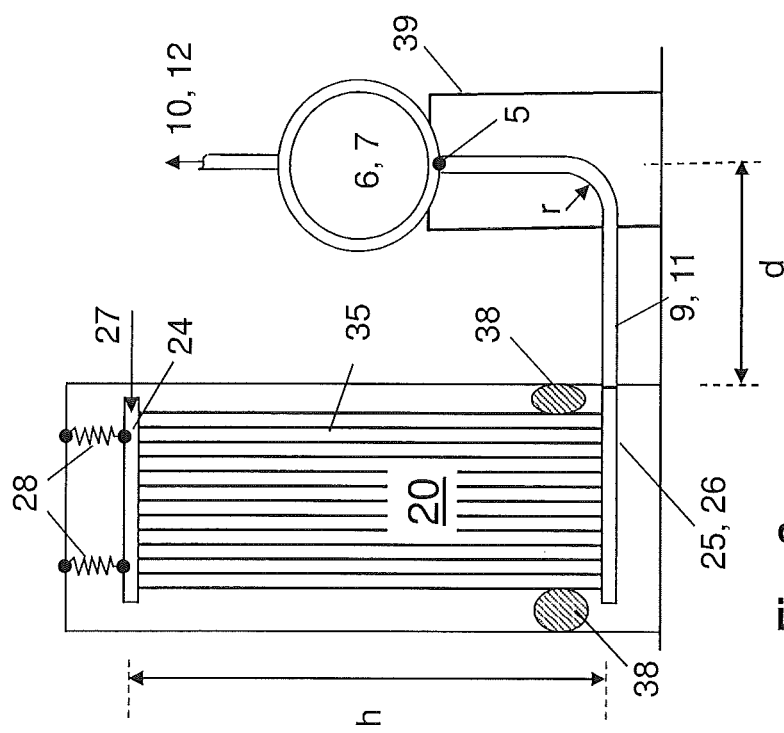

COMBINED CYCLE POWER PLANT

CROSS-REFERENCE TO RELATED APPLICATIONS

This application claims priority to PCT/EP2014/078467 filed Dec. 18, 2014, which claims priority to European Patent Application No. 13198291.0 filed Dec. 19, 2013, both of which are hereby incorporated in their entirety.

TECHNICAL FIELD

The invention relates to a combined cycle power plant with a gas turbine heat recovery steam generator and steam turbine.

BACKGROUND

Currently one of the preferred arrangements of a combined cycle power plant is a single shaft arrangement. Both the gas turbine and the steam turbine are arranged on the same shaft and drive a common generator. The major driver in favor of this arrangement is the cost benefit stemming from the fact, that only one large generator is needed.

Future plants will be significantly bigger than current single shaft power trains and we will be confronted higher steam parameters, i.e. higher pressures and temperatures. As a result, several design parameters change and the optimum configuration may differ from the current single shaft arrangement.

One of the problems of increasing the size is the steam lines, which will be correspondingly thicker. In addition with a tendency towards increased cycle parameters advanced and more costly steels must be employed, which again drives the cost per unit length of the steam line up. A new configuration, which minimizes the length of steam piping, would be advantageous.

Further, in a single shaft arrangement, the height of the shaft line is dictated by the length of the last stage blade of the low pressure steam turbine. The costly foundation of the gas turbine and an attached generator is therefore higher than actually needed considering gas turbine requirements alone.

In addition, the highly efficient air cooled generators, which are commonly used for single shaft power trains have a technology limit in terms of size, which implies that single shaft plants for future gas turbines would need to employ a less efficient and more expensive (first cost versus rated power) water cooled generator. Therefore todays cost benefit of the single shaft arrangement is deteriorating.

Both arguments have led to considerations to employ a multi-shaft configuration for the next generation of larger gas turbines. Conventionally the steam turbine and its own generator are placed parallel to the gas turbine axis at an offset. These arrangements are for example known from the U.S. Pat. No. 5,649,416. The two turbines are positioned such that they can be served with one and the same crane. The steam lines, which span a rather long axial distance in the case of the single shaft arrangement, now span a shorter axial distance in the multi shaft arrangement. However, the steam lines need to cover additional lateral distance, such that the overall length remains comparable to the length in a single shaft power arrangement. In consequence known single and multi-shaft combined cycle power plants will face considerable challenges with respect to arrangement, piping materials and costs.

SUMMARY

One aspect of the present disclosure is to propose a new combined cycle power plant with a gas turbine, and a first generator. The gas turbine typically comprises a compressor, a combustor and a turbine as well as a shaft connecting the compressor to the turbine. In operation the compressor pressurizes inlet air, which is mixed with fuel and ignited for generating combustion gases in a combustor, a turbine that extracts energy from the hot gases leaving the combustor. Further, a heat recovery steam generator is fluidly connected to the exhaust of the gas turbine to extract remaining useful heat, and a steam turbine, which is connected to the heat recovery steam generator with at least one of: a high pressure life steam pipe, a medium pressure hot reheat steam pipes and a low pressure steam pipe. A steam turbine shaft is connecting the steam turbine arrangement with a high pressure steam turbine and/or a medium pressure steam turbine, and a second generator.

To minimize the piping length the high pressure steam turbine and/or a medium pressure steam turbine is arranged directly next to the heat recovery steam generator, and the high pressure life steam pipe, and/or the medium pressure hot reheat steam pipe is connected to the heat recovery steam generator.

Heat recovery steam generators are typically high structures and the steam lines conventionally are taken from the top of the heat recovery steam generator and enter the steam turbine from the top. To reduce the steam piping length the high pressure life steam pipe is connecting the lower final lower superheat manifold to the high pressure steam turbine, and/or the medium pressure hot reheat steam pipe is connecting the final lower reheat manifold to the medium pressure steam turbine. A final lower manifold is the manifold at the bottom of a bundle collecting the steam from heat exchanger pipes of a bundle which extend in vertical direction from the top to the bottom of a bundle in the hot gas flow path inside the HRSG. It is the last manifold in flow direction of the steam before the steam leaves the HRSG. It is typically the manifold of the respective section which furthest upstream relative to the flow direction of the hot gases in the HRSG, i.e. the final lower superheat manifold is the manifold collecting steam from the bundle at the most upstream location relative the hot gas flow inside the superheater, and the final lower reheat manifold the manifold collecting steam from the bundle at the most upstream location relative the hot gas flow inside the reheater. A final bundle is the bundle at the most upstream location relative the hot gas flow inside the HRSG, respectively at the most upstream location of a section of the HRSG, i.e. of the reheater, respectively of the superheater.

To realize such a connection of the steam turbines to the heat recovery steam generator a modified design of the heat recovery steam generator is proposed, which is capable to absorb or reduce movements resulting from thermal dilatation inside the heat recovery steam generator (HRSG) structure, in particular to reduce movements of the connecting points to the hot steam pipes. According to one embodiment the high pressure life steam pipe, and/or the medium pressure hot reheat steam pipe is free of dilatation loops.

According to an embodiment, the heat recovery steam generator of the combined cycle power plant has a horizontal flow path for the flue gas and at least one top suspended tube bundle for high pressure steam and/or one top suspended tube bundle for intermediate pressure steam, each comprising several tube rows with parallel steam flow. The tubes in a bundle are typically arranged in a set of straight and parallel heat exchanger tubes which are connected at the top and at the bottom to a manifold. The steam enters the final superheat, respectively reheat bundle from the top through the upper manifold from where is distributed to the heat exchanger tubes. The heated steam leaves the bundle through the common lower manifold. At least one steam lines, which directs the hot steam to the respective steam turbine is an essentially a straight, axial extension of the respective lower manifold The tube system of the final superheat, respectively reheat bundle and its support structure are designed in a way that the unavoidable thermal displacements can be accommodated or at least partly be accommodated within the HRSG.

Horizontal movements in axial direction (parallel to the flue gas flow) can easily be absorbed by the heat exchanger pipes, which are long and flexible. The necessary extend of such a movement can also be reduced efficiently by aligning the respective fix points in the HRSG and in/at the steam turbine structure. The respective fix points in the HRSG and in/at the steam turbine structure can be in one plane. For example the fix points can be in a plane normal to the flow direction of the flue gases in the HRSG.

A fix point is a location where a pipe, bundle or manifold is mechanically fixed or supported. A fix point can have a mechanical fixation in all three dimensions, in a plane or only in one direction.

According to an embodiment of the combined cycle power plant the connection of the steam pipe with the HRSG at the respective lower manifold is not fixed but can change its position as the steam pipe and bundle thermally expands. In this embodiment the anchorage of the suspension of the upper manifold is fixed.

According to another embodiment of the plant the connection of the high pressure life steam pipe to the final lower superheat manifold and the final lower superheat manifold are free of fix points. Alternatively or in combination the connection of the medium pressure hot reheat steam pipe to the final lower reheat manifold and the final lower reheat manifold are free of fix points.

Free of a fix point in this context means that the manifold and pipe are not mechanically limited in their movement, i.e. there are no mechanical constraints.

In a further alternative free of a fix point can mean that the are no mechanical constraints in of the movement in one plane, i.e. the connection of the high pressure life steam pipe to the final lower superheat manifold and the final lower superheat manifold are freely moveable in a plane normal to the flow direction of the hot gas in the HRSG but a guidance or support can limit or dampen movement of the bundle in flow direction. Analogously the connection of the medium pressure hot reheat steam pipe to the final lower reheat manifold and the final lower reheat manifold can be freely moveable in a plane normal to the flow direction.

In yet another embodiment of the combined cycle power plant the bundle suspension for the top suspended bundle for high pressure steam has a fix point in the direction of the high pressure life steam pipe. Alternatively or in combination the bundle suspension for the top suspended bundle for medium pressure hot reheat has a fix point in the direction of the medium pressure hot reheat steam pipe. The direction of the respective pipe is the axial extension of the pipe at the interface to the HRSG (e.g. at the connection to the lower manifold).

The fix points for the reheat steam pipe can be at the connection to the medium pressure steam turbine and at the bundle suspension for the top suspended bundle for medium pressure hot reheat steam. The fix points for the life high pressure steam pipe can be at the connection to the high pressure steam turbine and at the bundle suspension for the top suspended bundle for high pressure steam.

Horizontal movements in lateral direction (normal to the flue gas flow) result essentially from the thermal expansion of the steam lines. The location of the axis of the steam turbine is fixed by its very nature. Thermal expansion of the steam line therefore leads to a lateral displacement of the lower manifold. Such a displacement depends on the length of the steam pipe and can for example be in the order of 20 cm. In view of the significant length of the straight heat exchanger tubes (for example in the order 20 m) rather small forces result if the lower manifold is displaced in horizontal direction while the upper manifold is kept at a practically unchanged horizontal position. The resulting small force can be transferred by the steam line and absorbed by its support structure.

Vertical movements of the lower manifold should be reduced to limit bending moments in the steam lines. In order to achieve this, the suspension of the superheat bundle, respectively reheat bundle is designed such that the upper manifolds can change its vertical position, i.e. is movable in vertical direction, to compensate at least part of the thermal dilation of the bundle tubes.

In other words the heat recovery steam generator comprises a bundle suspension which is movable in vertical direction to at least partly compensate for thermal expansion of the bundle.

According to one embodiment the bundle suspension comprises springs to allow for vertical movement. The springs can be designed to carry the weight of the bundle and manifolds. When the bundle expands due to changes in the temperature the springs contract and only a fraction of the weight (for example one or two orders of magnitude less than the suspended weight) will rest on the steam pipe connection the respective last lower manifold to the steam turbine. Thus a small, acceptable force (i.e. a force resulting only in elastic deformation) will be applied to the steam pipe which can lead to a bending and small displacement of the pipe and last lower manifold.

According to a further embodiment the final lower manifold for high pressure steam and the high pressure life steam pipe can be arranged in a straight line. Alternatively or in combination the final lower manifold for medium pressure steam and the hot reheat steam pipe can be arranged in a straight line. This straight line can preferably be horizontal. Practically it can be configured with a small inclination as required for drainage.

Additionally, the high pressure life steam pipe can have a single piping fix point, which can be the connection of the high pressure life steam pipe to the high pressure steam turbine. Similarly the hot reheat steam pipe can have a single piping fix point at the connection of the hot reheat steam pipe to the medium pressure steam turbine.

According to a further embodiment of the combined cycle power plant the high pressure life steam pipe is connected to bottom half of the high pressure steam turbine. Alternatively or in combination the hot reheat steam pipe is connected to the bottom half of the medium pressure steam turbine. Preferably the steam pipes can be connected vertically from below with an elbow. In contrast to this arrangement, the high pressure and the hot reheat steam pipes are connected to the top of the corresponding steam turbines in conventional combined cycle power plants, because the steam supply lines originate from the top of the heat recovery steam generator. The elevation of the shaft of the steam turbine is typically dictated by the length of the last stage blade and the selected arrangement of the condenser. This leads to a height of the steam turbine arrangement which leaves sufficient space below the inlet of the high pressure steam turbine and the medium pressure steam turbine to enter with the steam lines from below the respective turbines.

To minimize the length of hot steam piping the steam turbine is arranged as close as possible to the heat recovery steam generator. A minimum distance is typically required for the building or housing of the steam turbine and to allow good accessibility to the steam turbine. The distance between the HRSG and the high pressure, respectively medium pressure steam turbine can for example be reduced to less than 3 times the diameter of the steam turbine casing. According to one embodiment the distance between the steam turbine arrangements axis can be reduced to less than one times the diameter of the low pressure steam turbine's outer casing.

The heat recovery steam generator has a longitudinal direction aligned with the main flow direction of the gas turbine's hot flue gases. According to a further embodiment, the shaft or the gas turbine is axially aligned to the longitudinal direction of the heat recovery steam generator. Further the shaft of the high pressure steam turbine and/or the medium pressure steam turbine can be arranged parallel to the longitudinal direction of the heat recovery steam generator.

According to an alternative embodiment the shaft of the high pressure steam turbine and/or the medium pressure steam turbine is arranged at a right angle to the longitudinal direction of the heat recovery steam generator.

Conventional heat recovery steam generators can comprise a desuperheater, which is typically arranged on top of the heat recovery steam generator. Steam leaving the hot end of the heat recovery steam generator passes through the desuperheater before it enters the steam piping. Water spray can be injected into the desuperheater to control the steam parameters, in particular to control the steam temperature. To allow for complete evaporation of the injected droplets a minimum residence time of the droplets in the steam has to be assured before the steam reaches the steam turbine. In conventional plants with long steam piping the residence time in the steam lines is sufficient to ensure a complete evaporation of the injected water.

Such a configuration is appropriate as long as the temperature of the GT exhaust gases are at all operating cases sufficiently low, such that there is no need for a protection of the boiler internal heat exchanger tubes against excessive temperature. Particularly at advanced steam parameters—which are at the outset of the present application—such protection may be required. In such case it is advantageous to install a desuperheater station upstream (i.e. on the cold side) of the final superheater and eliminate the desuperheater station at the boiler outlet.

Further, with the proposed new arrangement the pipes may be too short for complete evaporation before the steam enters the steam turbine if the water is injected downstream of the heat recovery steam generator. Therefor a new desuperheater position inside the heat recovery steam generator is proposed, such that the injected water will completely evaporate within the bundle.

For high process temperatures this new arrangement further has the advantage that the maximum temperature of the last bundle can be controlled with the desuperheater, thus allowing a protection of the bundle against overheating.

Besides the power plant a method for operating a combined cycle power plant is an object of the disclosure. The method relates to operating a combined cycle power plant with a gas turbine coupled to a first generator, a heat recovery steam generator fluidly connected to the exhaust of the gas turbine and a steam turbine arrangement comprising a high pressure steam turbine and/or a medium pressure steam turbine and a second generator, in which the high pressure steam turbine and/or a medium pressure steam turbine is arranged next to the heat recovery steam generator. The heat recovery steam generator has a horizontal flow path and at least one top suspended bundle for high pressure steam comprising an upper manifold, which is connected to a supporting structure of the heat recovery steam generator by a bundle suspension, a lower superheat manifold, and vertically arranged heat exchange pipes, and/or at least one top suspended bundle for medium pressure steam comprising an upper manifold, which is connected to a supporting structure of the heat recovery steam generator by a bundle suspension, a lower reheat manifold, and vertically arranged heat exchange pipes. The plant further comprises at least a high pressure life steam pipe connecting the lower final lower superheat manifold to the high pressure steam turbine, and/or a medium pressure hot reheat steam pipe connecting the final lower reheat manifold to the medium pressure steam turbine.

The method is characterized in that thermal expansion of the high pressure life steam pipe is compensated by bending the heat exchanger pipes of the bundle in horizontal direction in a plane normal to the direction of the flue gas flow in the heat recovery steam generator and/or in that thermal expansion of medium pressure hot reheat steam pipe is compensated by bending the heat exchanger pipes of the bundle in horizontal direction in a plane normal to the direction of the hot gas flow in the heat recovery steam generator. Further, the thermal expansion of the heat exchanger pipes of the bundle is at least partly compensated by contracting of the bundle suspension.

An important element in realizing a combined power plant and method for operating a combined power plant described above is the use of bundle as a compensator. According to one embodiment the last bundle a superheater of a HRSG can be used as a compensator for thermal extension of a high pressure life steam pipe connected to a lower superheat manifold of the bundle. In particular the bundle can be used to compensate axial extension of the steam pipe. This expansion is typically in a plane normal to the flow direction of the flue gases in the HRSG and normal to the axial extension of the bundle's heat exchange pipes. Analogously the last bundle of a reheater of a HRSG can be used as to compensate for thermal extension a medium pressure hot reheat steam pipe connected to a lower reheat manifold of the bundle.

All of these embodiments can be used alone or in combination. The above described combined cycle power plant can comprise a single combustion gas turbine or a sequential combustion gas turbine as known for example from EP0620363 B1 or EP0718470 A2.

BRIEF DESCRIPTION OF THE DRAWINGS

The invention, its nature as well as its advantages, shall be described in more detail below with the aid of the accompanying drawings. Referring to the drawings.

WAYS OF IMPLEMENTING THE INVENTION

The same or functionally identical elements are provided with the same designations below. The values and dimensional specifications indicated are only exemplary values and do not constitute any restriction of the invention to such dimensions.

Figure 1:
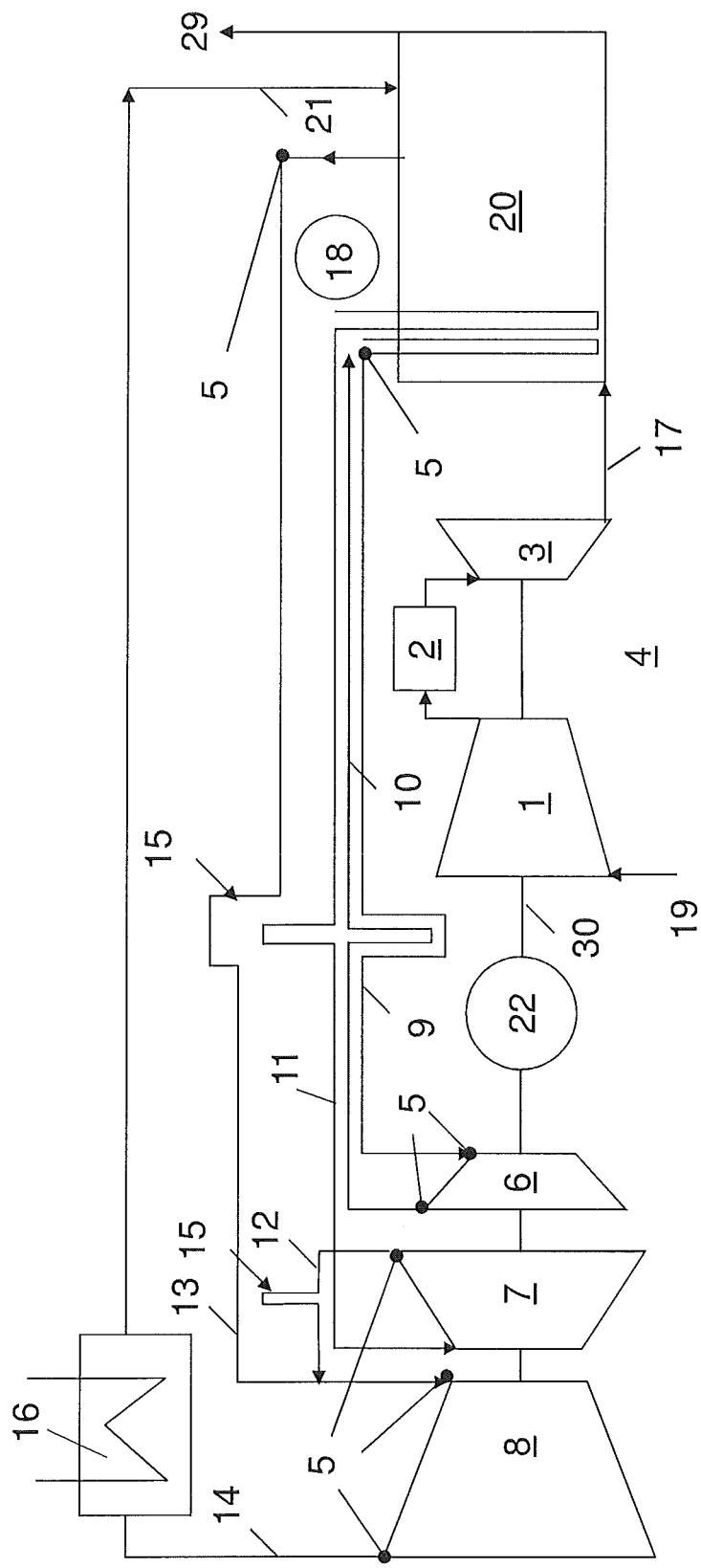
FIG. 1 schematically shows an example of a combined cycle power plant with a single shaft power train, FIGS. 2a and b schematically show combined cycle power plant arrangements known from the state of the art, FIGS. 2c to 2g schematically show examples of the disclosed combined cycle power plant arrangements, FIGS. 3a and 3c schematically show examples of a proposed new heat recovery steam generator arrangement, FIGS. 3b and 3d schematically shows the examples of a proposed new heat recovery steam generator arrangement of FIG. 3a respectively 3c in a hot operating state with the bundle and steam pipe thermally expanded, FIG. 4 schematically shows a side view of an example of a proposed new heat recovery steam generator arrangement with a desuperheater.

An exemplary arrangement of a state of the art combined cycle power plant with a single shaft power train is shown in FIG. 1. The gas turbine 4 is supplied with compressor inlet gas 19, and fuel. The compressor inlet gas 19 (for example air) is compressed in a compressor 1. The compressed gas is used for combustion of fuel in a combustor 2, and the pressurized hot gases expand in a turbine 3. During expansion in the turbine 3 the pressurized hot combustion gas drives the turbine to deliver mechanical power. The compressor and turbine are arranged on one shaft 30. The first generator 22 is also mechanically coupled to the shaft 30.

The gas turbine's hot flue gas 17 (also called exhaust gas) pass through a heat recovery steam generator 20, which generates live steam for a steam turbine 6, 7, 8 before they are released as flue gas 29 to the environment. The steam turbine 6, 7, 8 is arranged in a single shaft configuration with the gas turbine 4 and the first generator 22. The steam leaving the low pressure steam turbine 8 is sent to a condenser 16, and returned to the heat recovery steam generator 20 as feed water 21. The steam cycle is simplified and shown schematically without feed water pumps, drums etc., as these are not subject of the invention.

In this example a heat recovery steam generator 20 with three pressure levels comprising high pressure steam, intermediate pressure steam, and low pressure steam is shown. A high pressure life steam pipe 9 is provided to deliver high pressure steam to the high pressure steam turbine 6. A medium pressure hot reheat steam pipe 11 is provided to deliver hot reheated medium pressure steam to the medium pressure steam turbine 7. Steam from the high pressure steam turbine 6 is returned to the heat recovery steam generator 20 in a cold reheat line 10 and the steam is reheated in the heat recovery steam generator 20. Steam from the medium pressure steam turbine 7 is passing though the return pipe 12 (also called cross-over line) and joins with LP steam 13 from the HRSG and enters the LP steam turbine 8 steam from the low pressure steam turbine 8 is passing through the condenser neck 14 into the condenser 16. The condensate leaving the condenser is passed as feed-water 21 back to the heat recovery steam generator 20.

Each of the high pressure/intermediate pressure steam pipe 9, 11 has two fix points 5: one at the support of the final superheat/reheat bundle, and the other at the connection with the high pressure/intermediate pressure turbine. The routing of the steam pipes 9, 11, 13 as well as the steam return pipes 10, 12, 14 includes dilatation loops 15, which absorb the thermal expansion of the piping.

Figure 2C:
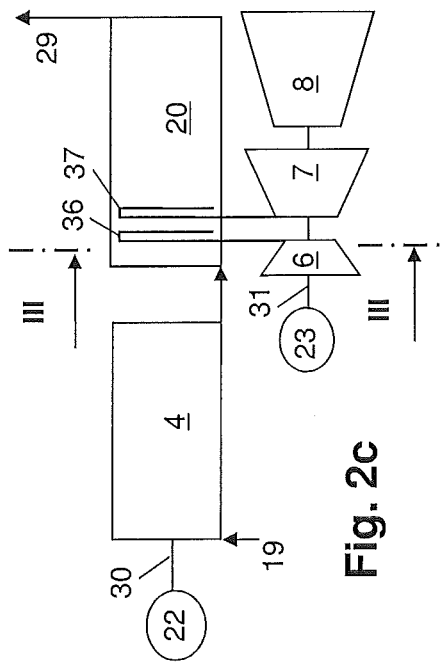
Figure 2D:
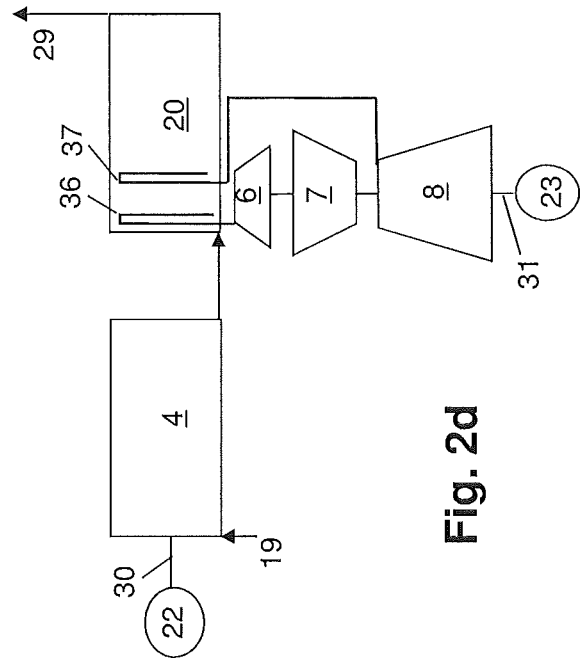
Figure 2A:
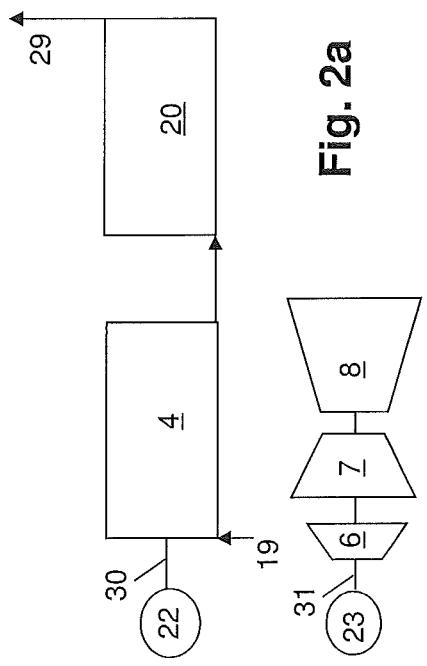

FIG. 2a shows a combined cycle power plant arrangement with a multi-shaft arrangement as known from the state of the art. The gas turbine 4 and a first generator 22 are aligned and connected by a shaft 30. The heat recovery steam generator 20 is arranged downstream of the gas turbine 4. Inlet gas 19 is provided to the gas turbine 4 and flue gas 29 is released to the environment.

In this example the steam turbine comprises a high pressure steam turbine 6, a medium pressure steam turbine 7, and a low pressure steam turbine 8, which are arranged along a shaft 31 and drive a second generator 23. The steam turbine 6, 7, 8 and gas turbine 4 are arranged parallel to each other such that a common crane (not shown) can service both the gas turbine 4 including the first generator 22 as well as the steam turbines 6, 7, 8 with the second generator 23.

Figure 2B:
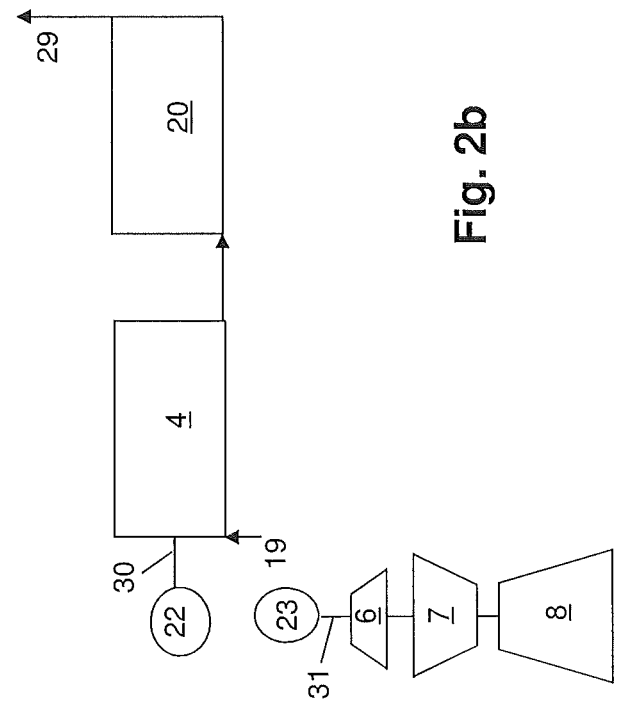

FIG. 2b shows a combined cycle power plant arrangement with an example for a proposed new multi-shaft arrangement. As in FIG. 2a the gas turbine 4 and a first generator 22 are aligned and connected by a shaft 30. The heat recovery steam generator 20 is arranged downstream of the gas turbine 4. Piping and gas turbine components are the same as shown in FIG. 1 but greatly simplified or omitted for clarity.

In this example the steam turbine 6, 7, 8 also comprises a high pressure steam turbine 6, a medium pressure steam turbine 7, and a low pressure steam turbine 8, which are arranged along a shaft 31 and drive a second generator 23. Further, in this example the steam turbine 6, 7, 8 and gas turbine 4 are arranged under a 90° angle with the first generator 22 and second generator 23 next to each other. Also with this arrangement a common crane (not shown) can service both: the gas turbine 4 including the first generator 22 as well as the steam turbines 6, 7, 8 with the second generator 23.

Because the heat recovery steam generator is typically not in a building housing the turbines and would be too high for a crane bridge, the turbines shown in FIGS. 2a and 2b are arranged in an area upstream of the heat recovery steam generator.

FIGS. 2c to 2g each show an example of a combined cycle power plant arrangement according to the invention. They comprise the same elements as the arrangement shown in FIGS. 2a and 2b. Here, the steam turbine 6, 7, 8 is not arranged next to the gas turbine 4 but next to the heat recovery steam generator 20.

In FIG. 2c the shaft 31 connecting the steam turbine 6, 7, 8 and the second generator 23 is arranged parallel to the longitudinal direction of the heat recovery steam generator. The high pressure steam turbine 6 and medium pressure steam turbine 7 are arranged parallel to the upstream section (for example the upstream half) of the heat recovery steam generator 20 to minimize the required piping length from the heat recovery steam generator to the steam turbine 6, 7.

To minimize steam pipe lengths the inlet of the high pressure steam turbine 6 is at the same axial location as the outlet manifold of the final superheater bundle 36 and inlet of the medium pressure steam turbine 7 is at the same axial location as the outlet manifold of the final reheater bundle 37. The superheater 36 is arranged upstream of the reheater 37 in the heat recovery steam generator 20. The high pressure steam turbine 6 has an axial extension with counterflow to the hot gas flow in the heat recovery steam generator 20 and medium pressure steam turbine 7 has an axial extension coinciding with the hot gas flow in the heat recovery steam generator 20. The second generator 23 is coupled to the high pressure steam turbine at its downstream end, and a low pressure steam turbine 8 is connected to the medium pressure steam at its outlet end via the shaft 31. The low pressure steam turbine 7 has an axial extension coinciding with the hot gas flow in the heat recovery steam generator 20; the steam leaving the low pressure steam turbine at the far end relative to the second generator 23, at a location with sufficient space to easily connect and arrange a condenser (not shown).

In FIG. 2d the shaft 31 connecting the steam turbine 6, 7, 8 and the second generator 23 is arranged at a right angle to the longitudinal direction of the heat recovery steam generator. The high pressure steam turbine 6 is arranged with its front face and inlet next to the heat recovery steam generator 20. The medium pressure steam turbine 7 is arranged next to the high pressure steam turbine 6 in a direction pointing away from the heat recovery steam generator 20. In this arrangement the required piping length to the high pressure steam turbine 6 is minimized. To this end the inlet of the high pressure steam turbine 6 is at the same axial location as the bundle and final manifold of the superheater 36. The high pressure steam pipe 9 can extend as a straight line from the last manifold to the inlet of the high pressure steam turbine 6.

The piping length to the high pressure steam turbine 6 can remain short. In contrast to the other arrangements the second generator 23 is connected to the steam turbines 6, 7, 8 at the end of the low pressure steam turbine 8.

Figure 2F:
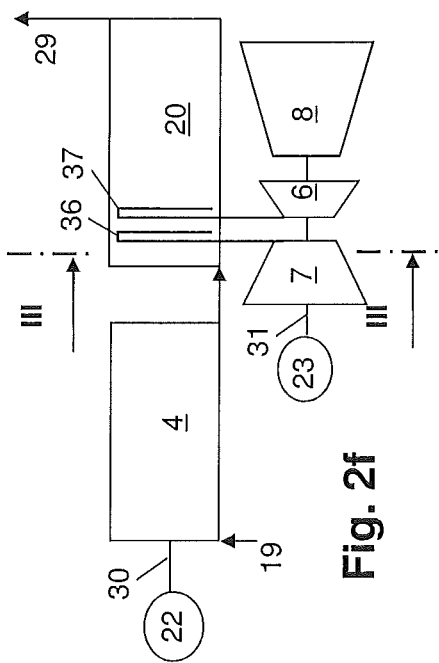
Figure 2E:
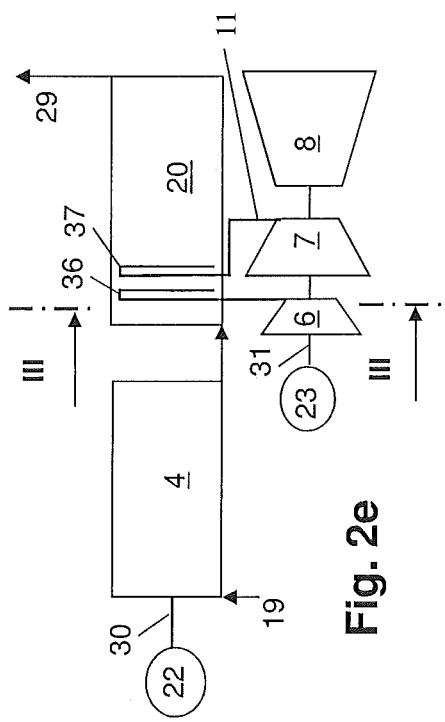

The embodiment of FIG. 2e is based on FIG. 2c. To better balance the thrust of steam turbine 6, 7, 8 the flow direction of the medium pressure steam turbine 7 is reversed and orientated in counterflow to the to the flue gas 17 flow in the heat recovery steam generator 20. Due to the axial extension of the medium pressure steam turbine 7 the inlet is not in the same axial plane as the bundle and last manifold of the reheater 37. Therefore the medium pressure hot reheat steam pipe 11 has a bend in axial direction, followed by a pipe section parallel to the flue gas 17 flow direction and a second bend for connection to the medium pressure steam turbine 7.

The embodiment of FIG. 2f is also based on FIG. 2c. In this embodiment the orientation and location of the high and medium pressure steam turbines 6, 7 are switched. Correspondingly the reheater 37 is located at the entrance of the heat recovery steam generator 20 upstream of the superheater 36.

Again to minimize steam pipe lengths the inlet of the high pressure steam turbine 6 is at the same axial location as the bundle and final manifold 25 of the superheater 36 and inlet of the medium pressure steam turbine 7 is at the same axial location as the bundle and final manifold 26 of the reheater 37. In each case a straight steam pipe 9, 11 connects the respective steam turbine 6, 7 to the respective final manifold 25, 26.

Figure 2G:
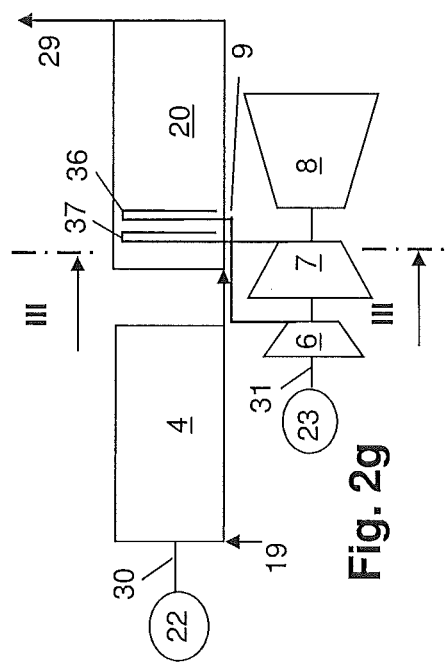

The embodiment of FIG. 2g is based on FIG. 2f. To balance the axial thrust of the steam turbines 6, 7, 8 the high pressure steam turbine 6 is arranged between the medium pressure steam turbine 7 and the second generator 23 and oriented in the same direction as the medium pressure steam turbine 7. Correspondingly, the reheater 37 is located at the entrance of the heat recovery steam generator 20 upstream of the superheater 36.

To connect the high pressure steam turbine 6 to the last manifold of the superheater 36 the high pressure life steam pipe 9 has a bend upstream in axial direction, followed by a pipe section parallel and in counterflow to the hot gas flow direction and a second bend for connection to the high pressure steam turbine 6.

The LP steam turbine is shown in all FIGS. 2.a through 2.g as a single flow turbine with axial steam exhaust. It might as well be a double flow turbine with lateral steam exhaust.

Figure 3B:
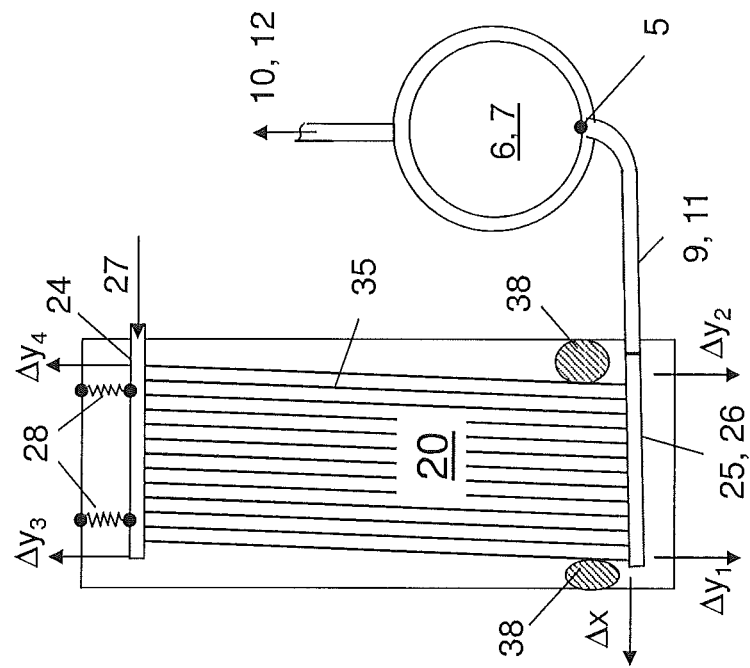
Figure 3A:
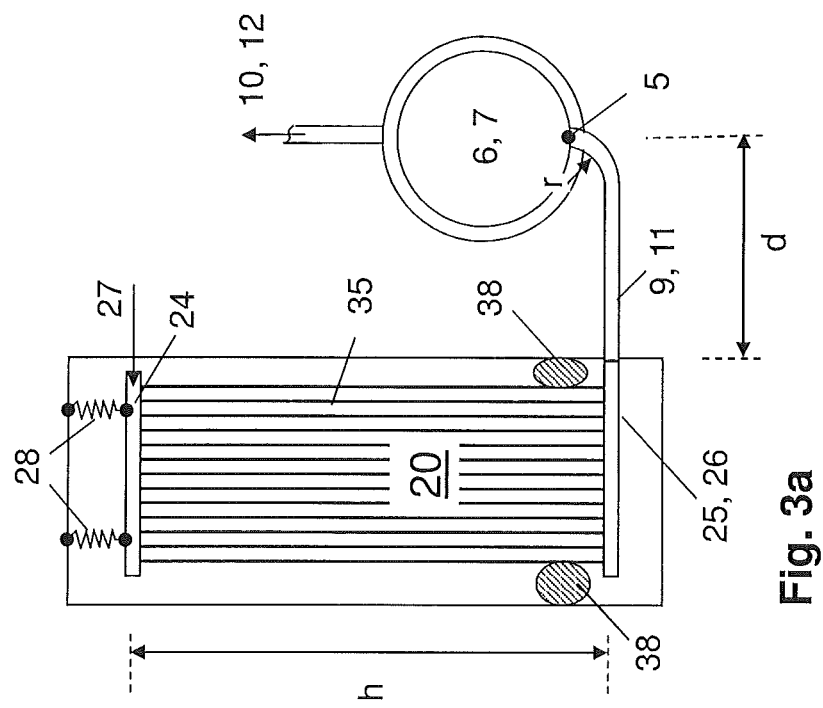

To take full advantage of the disclosed plant arrangement an arrangement with a newly disclosed heat recovery steam generator 20 and steam pipes 9, 11 is proposed. FIG. 3a shows the situation for a near floor mounted steam turbine.

The proposed heat recovery steam generator 20 has a horizontal flow path and comprises at least one top suspended bundle 35. The bundle 35 comprises an upper manifold 24, which is connected to a supporting structure of the heat recovery steam generator 20 by a bundle suspension 28, a lower manifold 25, 26, and vertically arranged heat exchange pipes. The heat recovery steam generator 20 comprises at least one such bundle 35 for high pressure steam or one bundle 35 for reheating medium pressure steam. Other components of the heat recovery steam generator 20 are known from the state of the art and not shown here.

The heat exchange pipes are typically arranged as rows of tubes or as tube banks between upper and lower manifold 24, 25, 26 (also called upper header and lower header). An inlet 27 for feeding steam is arranged at the top leading to the upper manifold 24.

In each case the final lower manifold is 25, 26 is directly connected to a steam pipe 9, 11, which connects the heat recovery steam generator 20 to the respective steam turbine 6, 7. Correspondingly, a lower manifold 25 for high pressure steam is connected to the high pressure steam turbine 6 by the high pressure life steam pipe 9 and a lower manifold 25 for medium pressure steam is connected to the medium pressure steam turbine 7 by the medium pressure hot reheat steam pipe 11. The steam pipes 9, 11 are fixed to a piping fix point 5 at the corresponding steam turbine 6, 7.

As the straight heat exchanging tubes are of each bundle 35 heated or cooled down in the course of operation the distance between upper and lower manifold 24, 25, 26 changes. The straight heat exchanger tubes can for example be about 20 m long leading to a variation in length of roughly 20 cm due to operational temperature change. The bundle suspension 28 can absorb at least part of the resulting movement. The example of FIG. 3a is shown in the warm operating state in FIG. 3b. In the example shown the bundle suspension 28 is spring loaded and pulls the upper manifold 24 vertically up. Due to the thermal expansion of the bundle 35 the length of the spring is reduced, consequently reducing the spring force. As a result a small force will be applied to the steam pipe 9, 11 which is fixed at the fix point 5 to the steam turbine 6, 7. Due to this force the steam pipe 9, 11 can be bent. This bending can lead to a deviation in the steam pipes vertical position and in the position and orientation of the final lower superheat manifold 25, respectively the final lower reheat manifold 26 which is proportional to the horizontal distance to the fix point 5. At the far end the final lower manifold 25, 26 will be lowered by a first displacement $\Delta y_1$ and at the end closer to the fix point 5 it will be lowered by a second displacement $\Delta y_2$. The first displacement $\Delta y_j$ can be larger than the second displacement $\Delta y_2$.

Corresponding to the first displacement $\Delta y_1$, and second displacement $\Delta y_2$ the upper manifold 24 is lifted by the bundle suspension 28 by a third displacement $\Delta y_3$, and a forth displacement $\Delta y_4$. The third displacement $\Delta y_3$ of the far end of the upper manifold above the far end of the lower final manifold 25, 26 is equal to the elongation of the bundle 35 due to thermal expansion minus the first displacement $\Delta y_1$. The forth displacement $\Delta y_4$ of the end of the upper manifold above the end of the lower final manifold 25, 26, which is closer to the fix point 5, is equal to the elongation of the bundle 35 due to thermal expansion minus the second displacement $\Delta y_2$.

The fix point 5 of the steam turbine has distance d to the connection of the steam pipe 9, 11 to the final lower manifold 25, 26. The distance d leads to a displacement $\Delta x$ in horizontal direction of the final lower manifold due to thermal expansion of the steam pipe 9, 11 during operation. This displacement can easily be absorbed by the bundle 35 because the heat exchanger pipes are long and flexible.

A second example on how to take advantage of the disclosed plant arrangement an arrangement with a newly disclosed heat recovery steam generator 20 and steam pipes 9, 11 is shown in FIG. 3c.

The example of FIG. 3c is based on the example of FIG. 3a. It differs from the example of FIG. 3a in that the steam turbine 6, 7, is elevated above the ground (so called table mounted steam turbine). In this example the steam turbine 6, 7 is mounted on a steam turbine table 39. Table mounted in this context can include mounting on high foundations, which for example can extend to a height above the ground of at least half the radius of the supported steam turbine's casing or more.

Due to the elevated mounting of the steam turbine 6, 7 the steam pipe 9, 11 comprises an additional section which extends from the fix point 5 down in vertical direction before it is bend to a section extending in horizontal direction to the final lower manifold 25, 26.

Because of the elongation due to the thermal expansion of the vertical section of the steam pipe 9, 11 the horizontal section of the steam pipe 9, 11 will be moved down by a displacement $\Delta y_5$ in vertical direction. This vertical displacement $\Delta y_5$ compensates at least part of the extension of the bundle and is superimposed on the displacements $\Delta y_1$, $\Delta y_2$ due to bending of the steam pipe 9, 11. The required compensation $\Delta y_3$, $\Delta y_4$ of bundle suspension 28 is reduced correspondingly.

Figure 4:
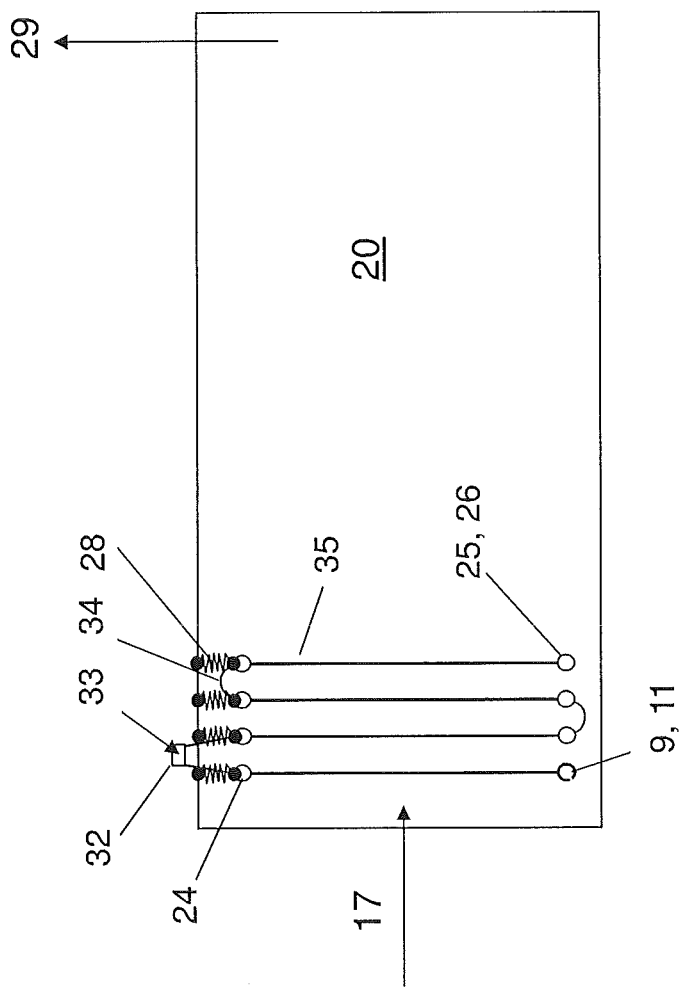

FIG. 4 schematically shows a side view of an example of a proposed new heat recovery steam generator 20 with suspended superheat, respectively reheat bundles 35 arranged close to the inlet of the hot flue gas 17 (heat transfer elements further downstream in the hot flue gas 17 flow are omitted in this schematic drawing). The suspended bundles 35 are retained in their position by bundle suspensions 28 from the top of the heat recovery steam generator. They comprise lower manifolds 25, 26 and upper manifolds 24, which are connected by link pipes 34. A desuperheater 32 is arranged in the link between the first (final) and second bundle 35 in flow direction of the flue gas 17 passing through the heat recovery steam generator 20.

Water spray 33 can be injected into the desuperheater 32 to control the steam parameters (temperature) leaving the lower manifold 25, 26 of the first bundle 35 (in flow direction of the flue gas 17) through the steam pipe 9, 11. Further, since the desuperheater is arranged upstream (with respect to the steam flow) of the final suspended bundle 35 which is exposed to the hot flue gas 17, the maximum material temperature of the bundle 35 can be controlled with the desuperheater 32

It will be appreciated by those skilled in the art that the present invention can be embodied in other specific forms without departing from the spirit or essential characteristics thereof. The presently disclosed embodiments are therefore considered in all respects to be illustrative and not restricted.

What is claimed is:

1. A combined cycle power plant comprising a gas turbine coupled to a first generator, a heat recovery steam generator (HRSG) fluidly connected to an exhaust of the gas turbine, and a steam turbine arrangement comprising a high pressure steam turbine and/or a medium pressure steam turbine and/or a low pressure steam turbine connected to the heat recovery steam generator with at least one of: a high pressure life steam pipe, a medium pressure hot reheat steam pipe and a low pressure steam pipe, and a steam turbine shaft connecting the steam turbine arrangement and a second generator, the combined cycle further comprising:
   at least one HRSG supporting structure; and
   at least one bundle comprising:
      a bundle suspension comprising at least one spring, the bundle suspension coupled to the at least one HRSG supporting structure:
      an upper manifold coupled to the bundle suspension:
      a plurality of vertically arranged heat exchanger pipes coupled to the upper manifold: and
      a lower manifold coupled to the plurality of vertically arranged heat exchanger pipes,
      wherein the bundle suspension is spring loaded via the at least one spring and pulls the upper manifold vertically upward, and
      wherein the high pressure steam turbine and/or the medium pressure steam turbine is arranged next to the heat recovery steam generator with the high pressure life steam pipe connecting a final lower superheat manifold to the high pressure steam turbine, and/or the medium pressure hot reheat steam pipe connecting a final lower reheat manifold to the medium pressure steam turbine.

2. A combined cycle power plant according to claim 1, wherein the high pressure life steam pipe, and/or the medium pressure hot reheat steam pipe is free of dilatation loops, and
   wherein the high pressure steam turbine is arranged such that both a steam turbine front face and a steam turbine inlet are adjacent to the HRSG.

3. A combined cycle power plant according to claim 1, wherein the heat recovery steam generator has a horizontal flow path, wherein the at least one bundle is movable in a vertical direction to at least partly compensate for thermal expansion of the at least one bundle.

4. A combined cycle power plant according to claim 1, wherein the final lower superheat manifold for high pressure and the high pressure life steam pipe and/or that the final lower reheat manifold for medium pressure and the medium pressure hot reheat steam pipe are arranged in a straight line.

5. A combined cycle power plant according to claim 1, wherein the high pressure life steam pipe and/or that the medium pressure reheat steam pipe consists of a horizontal section and an elbow or consists of a horizontal section, an elbow and vertical section, and
   wherein a flow direction of the medium pressure steam turbine is reversed and orientated in a counterflow arrangement to that of a flue gas flow in the heat recovery steam generator.

6. A combined cycle power plant according to claim 1, wherein the high pressure life steam pipe has a single piping fix point at a first connection of the high pressure life steam pipe to the high pressure steam turbine, and/or the medium pressure hot reheat steam pipe has a single piping fix point at a second connection of the medium pressure hot reheat steam pipe to the medium pressure steam turbine, and wherein each of the single piping fix point comprises mechanical fixations in three dimensions.

7. A combined cycle power plant according to claim 1, wherein a first connection of the high pressure life steam pipe to the final lower superheat manifold is free of fix points, and/or a second connection of the medium pressure hot reheat steam pipe to the final lower reheat manifold is free of fix points.

8. A combined cycle power plant according to claim 1, wherein the bundle suspension for a top suspended bundle for high pressure steam has a fix point in a direction of an axial extension of the high pressure life steam pipe and/or in that the bundle suspension for a top suspended bundle for medium pressure hot reheat has a fix point in a direction of the axial extension of the medium pressure hot reheat steam pipe, and wherein each of the fix point comprises mechanical fixations within a single plane.

9. A combined cycle power plant according to claim 1, wherein the high pressure life steam pipe is connected to the high pressure steam turbine from below and/or the medium pressure hot reheat steam pipe is connected to the medium pressure steam turbine from below, and wherein the lower manifold and the upper manifold are connected via one or more link pipes.

10. A combined cycle power plant according to claim 1, wherein the high pressure life steam pipe is connected to the high pressure steam turbine with a pipe elbow and/or the medium pressure hot reheat steam pipe is connected to the medium pressure steam turbine with a pipe elbow, and in that a ratio of a mean radius (r) of each of the pipe elbow to a corresponding pipe diameter is greater than 2.

11. A combined cycle power plant according to claim 1, wherein the heat recovery steam generator has a longitudinal direction aligned with a main flow direction, and in that the steam turbine shaft is arranged parallel to the longitudinal direction of the heat recovery steam generator.

12. A combined cycle power plant according to claim 1, wherein at least one of the medium pressure steam turbine and the high pressure steam turbine is table mounted and in that the high pressure life steam pipe has an extension in vertical direction and/or that the medium pressure hot reheat steam pipe has an extension in vertical direction such that due to pipe's thermal expansion during operations, a thermal expansion of part of the at least one bundle is compensated.

13. The combined cycle power plant of claim 1, wherein the vertically arranged heat exchanger pipes are disposed within a superheater section of the HRSG.

14. The combined cycle power plant of claim 1, wherein the vertically arranged heat exchanger pipes are disposed within a reheater section of the HRSG.

* * * * *